JAMES M. HYER.
JAMES M. EASTMAN.
INVENTORS

BY
Gordon H. Chenez
AGENT

PROPORTIONAL WITH
INPUT RESTRICTIONS.

JAMES M. HYER.
JAMES M. EASTMAN.
INVENTORS

BY

Gordon H. Cheney
AGENT.

| DIMENSION TABLE | |
|---|---|
| DIM | |
| A | .0372-.0392 |
| B | .0485-.0505 |
| C | .0065-.0085 R |
| D | .198 - .202 R |
| E | 40° |
| F | 0° |
| G | .800 R. |
| H | .1702-.1742 |
| I | .454-.459 |
| J | .9105-.9165 |
| K | .0115 -.0135 R |
| L | .0107-.0127 |
| M | .1367-.1387 |
| N | .009-.011 R. |
| O | 8.5° |
| P | 6° |
| Q | 42° |
| R | .1165-.1185 |
| S | 7° |
| T | .0745-.0765 |
| U | .2105-.2165 |
| V | .275-.280 |
| W | 45° |
| X | .085-.090 R. |
| Y | 23° |
| Z | .601-.606 |
| AA | 12° |
| BB | 16° |
| CC | .190 R. |
| DD | .470 |
| EE | .150 |
| FF | .150 R. |
| GG | 46° |
| HH | 15° |
| II | 55° |

JAMES M. HYER
JAMES M. EASTMAN.
INVENTORS.

BY [signature]
AGENT.

United States Patent Office 3,486,520
Patented Dec. 30, 1969

3,486,520
DEFLECTOR FLUIDIC AMPLIFIER

James M. Hyer and James M. Eastman, both of 717 N. Bendix Drive, South Bend, Ind. 46628
Filed July 26, 1967, Ser. No. 656,135
Int. Cl. F15c *1/08*
U.S. Cl. 137—81.5 12 Claims

ABSTRACT OF THE DISCLOSURE

A fluidic amplifier having a power fluid jet which is directed through a flow conduit including symmetrically located concave walls which converge in the direction of power jet flow with the power jet emerging therefrom and passing through a relatively low pressure chamber to impinge on a flow splitter which divides the power jet flow between output receiver passages. A control fluid pressure differential imposed transversely against the power jet and delivered from opposed control fluid ports upstream from the concave walls causes the power jet to impinge one of the concave walls and be deflected accordingly into one of the output receiver passages. Special orientation of the walls of the conduit and the low pressure chamber together with an associated plurality of vent parts downstream from the concave walls render the fluidic amplifier operable as a mono-stable, bistable, or proportional dual or single output device with high gain characteristics.

BACKGROUND OF THE INVENTION

Fluidic or pure fluid amplifiers have, in a relatively short span of years, progressed from a laboratory curiosity with no immediate usefulness to potential replacement units for mechanical, electrical and/or hydromechanical control networks in control systems such as computers, actuators, control systems and the like. The advantages of fluidic amplifiers over mechanical and/or electrical devices performing similar control functions are well known and include insensitivity to environmental conditions such as vibration, temperature, humidity and radioactive radiation. In general, fluidic amplifiers are lighter in weight, smaller in volume, less expensive, require less maintenance and, in many applications, are more reliable then mechanical and electrical devices performing similar functions.

A number of different types of fluidic amplifiers exist, the most common of which may be classified in basic categories such as turbulence type, vortex type, jet-interaction type and boundary layer type. Each type has distinguishing characteristics which render a given type amplifier particularly adaptable for use under certain functional requirements and/or operational conditions. The boundary layer and jet interaction types appear to be the most versatile types and have undergone considerable development resulting in modifications and improvements thereof in order to improve characteristics thereas such as (1) the pressure gain, (2) the flow gain, (3) pressure recovery, (4) zero null control flow, (5) retention of performance with supersonic supply to vent pressure ratios, or (6) versatility.

SUMMARY OF THE INVENTION

Even with the heretofore mentioned advancement of the art, there is a need in the automatic control art for a fluidic amplifier which combines the abovementioned characteristics and, in particular, may be readily adapted for use as a proportionally operating single or dual output amplifier, a mono-stable amplifier or a bi-stable amplifier in various modified forms.

It is an object of the present invention to provide a jet type fluidic amplifier characterized by relatively high system fluid pressure and flow gain and adapted to operate with little or no control input fluid flow under a null operating condition.

It is an object of the present invention to provide a jet type fluidic amplifier capable of operation as a mono-stable, bi-stable or proportional fluidic amplifier.

DESCRIPTION OF THE PREFERRED EMBODIMENT

Figure 1:
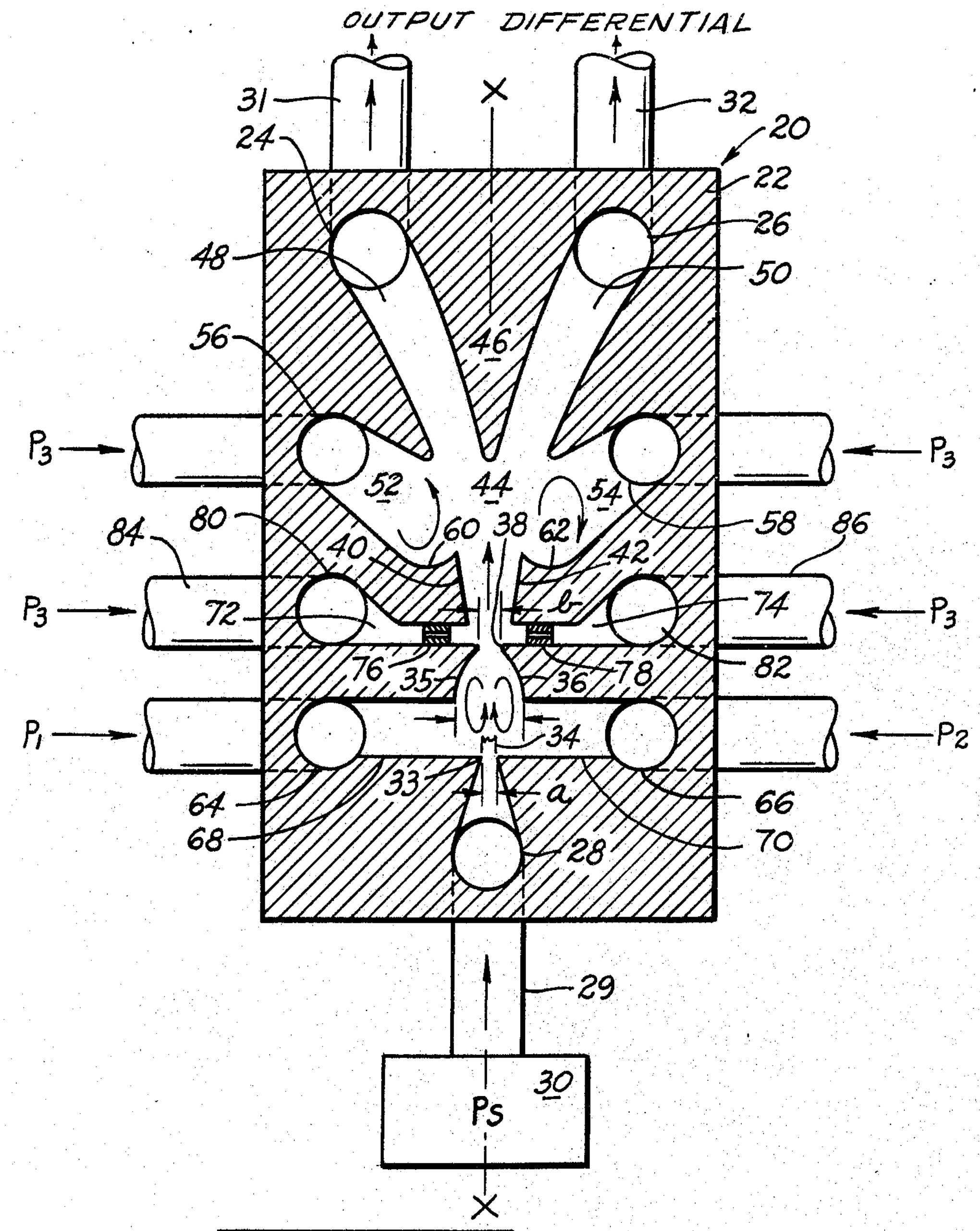
FIGURE 1 represents a schematic illustration of a fluidic amplifier embodying the present invention.

Referring to FIGURE 1, numeral 20 represents a fluidic amplifier having a casing 22 provided with a pair of fluid outlet ports 24 and 26 and a fluid inlet port 28. The fluid inlet port 28 is connected via a passage 29 to a source of pressurized fluid 30 at pressure $P_s$ which may be any suitable gas or liquid but, in the following description, will be assumed to be air. The fluid outlet ports 24 and 26 are connected via passages 31 and 32 respectively to suitable conventional output load means, not shown, which characteristically varies the output pressure in response to the fluid output from ports 24 and/or 26.

The inlet port 28 communicates supply fluid at pressure $P_s$ with an orifice 33 of width *a* from which the fluid issues as a corresponding jet 34 that passes between spaced apart deflector walls 35 and 36 which are concave and converge in the direction of flow therebetween to form an orifice 38 of width *b* through which the fluid jet freely passes. From orifice 38, the fluid jet passes between spaced apart walls 40 and 42 which diverge in the direction of flow therebetween and terminate at a chamber 44 through which the fluid jet passes to subsequently impinge a wedge shaped splitter member 46 which splits the fluid jet into two portions with one portion passing to outlet passage 48 leading to port 24 and the other portion passing to outlet passage 50 leading to port 26. It will be noted that the orifice 33, orifice 38 and splitter member 46 are aligned on axis $x—x$ and walls 35 and 36 as well as walls 40 and 42 are symmetrical and equally spaced on opposite sides of axis $x—x$.

The chamber 44 is provided with opposed vent passages 52 and 54 leading to associated ports 56 and 58 which vent passages are provided with curved wall portions 60 and 62, respectively.

Control fluid ports 64 and 66 communicate pressurized fluid from separate sources of pressurized fluid $P_1$ and $P_2$, respectively to associated aligned opposed control fluid inlet passages 68 and 70 which establish the control pressures on the sides of the power jet 34 intermediate the orifice 33 and walls 35, 36 to thereby impose a control fluid pressure differential $P_1$–$P_2$ across jet 34 which tends to deflect the power jet 34 toward wall 35 or 36 depending upon the higher of the two pressures $P_1$ and $P_2$ and to a degree depending upon the pressure differential therebetween.

Opposed and aligned control fluid passages 72 and 74 are arranged transversely relative to power jet 34 and open into communication therewith intermediate orifice 38 and walls 40, 42. Passages 72 and 74 are provided with restrictions 76 and 78, respectively and communicate with associated ports 80 and 82. Ports 80 and/or 82 may be vented to vent source at relatively low pressure $P_3$ via passages 84 and 86, respectively, as shown in FIGURES 2 through 4, 7 and 8 or, in the alternate venting arrangements of FIGURES 5 and 6, may be singly or both blocked off by suitable plugs 88 or 90.

Figure 2:
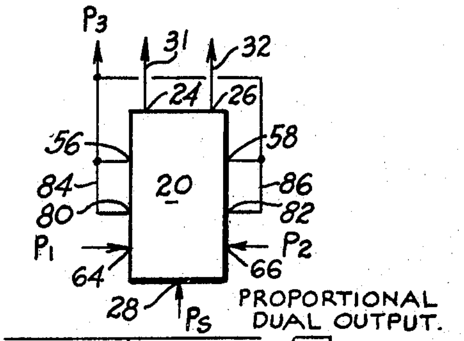
FIGURE 2 represents the fluidic amplifier of FIGURE 1 in block form with the various parts thereof connected to provide dual output proportional operation.

Referring to FIGURE 1, it will be assumed that the ports 80 and 82 as well as ports 56 and 58 are vented as shown in FIGURE 2 to the vent source at relatively low fluid pressure $P_3$ to establish proportional operation wherein the control output differential at ports 24 and 26 is proportional to the control input differential derived from inlet passage 68 and 70 and imposed on power jet 34.

Further assuming a null condition such that the control fluid pressures $P_1$ and $P_2$ at control passages 68 and 70, respectively are equalized, the control pressure differential $P_1$–$P_2$ across jet 34 will be zero thereby permitting unobstructed passage of jet 34 axially through orifice 38 and between walls 40 and 42 then through chamber 44 at relatively low vent pressure $P_3$ into subsequent impingement with splitter 46 which splits the power jet 34 into two equal fluid streams directed into respective output passages 48 and 50 resulting in a zero pressure differential at output ports 24 and 26. It will be understood that the above described null condition may occur over a wide range of control fluid pressure at control fluid inlet passages 64 and 66 providing the control fluid pressures $P_1$ and $P_2$ are equalized resulting in a zero pressure differential across jet 34. At null conditions, the loss of control fluid flow at inlet passages 64 and 66 due to entrainment of the control fluid by jet 34 may be reduced to zero by sizing the orifice 38 width *b* to closely approach the effective width *a* of the power jet 34. While the flow characteristics in the region of the orifice 38 are somewhat complex and not readily determinable, it appears that passage of the jet 34 in close proximity to the edges of orifice 38 results in the turning back of the control fluid flow entrained by jet 34 in passing control inlet passages 68 and 70 to thereby establish a vortex flow intermediate the walls 35 and 36 and adjacent side of jet 34 as indicated by the arrows in FIGURE 1. The vortex flow thus established generates a fluid impedance to further entrainment of control fluid flow from passages 68 and 70 thereby reducing the flow from the latter passages to little or none. Thus, a minimum control flow differential between inlet passages 68 and 70 is required to produce deflection of the jet 34 and corresponding relatively large change in differential output at output ports 24 and 26 which establishes a correspondingly high gain system.

Assuming the control fluid pressure $P_1$ at inlet passage 68 is increased to generate a $P_1$–$P_2$ pressure differential across jet 34, the jet 34 is proportionally deflected to the right as viewed in FIGURE 1 to subsequently impinge wall 36 and deflect therefrom angularly relative to axis *x—x* in the direction of outlet passage 48. The resulting greater portion of jet 34 directed to outlet passage 48 produces a corresponding differential output at outlet ports 24 and 26. It will be noted that a relatively small angular deflection of jet 34 in response to the control fluid pressure differential $P_1$–$P_2$ thereacross results in impingement of jet 34 against wall 36 which, in turn, causes a relatively large angular deflection of jet 34 thus producing a high flow gain or differential at outlet ports 24 and 26.

It has been found that, if the walls 35 and 36 are made concave as shown, and set at an appropriate angle with axis *x—x*, the upstream spacing *c* of walls 35 and 36 can be selected to attain not only a zero null control flow as mentioned above but also substantially zero control flow through inlet passages 68 and 70 for significantly large $P_1$–$P_2$ control fluid pressure differentials, which results in essentially infinite control input impedance and corresponding maximized gain of the system.

The above described deflection of power jet 34 will occur but to the left as viewed in FIGURE 1 in response to a like control fluid pressure differential $P_2$–$P_1$ occurring as a result of pressure $P_2$ exceeding pressure $P_1$ which, in turn, produces a corresponding reversal of the output differential at output ports 24 and 26.

The walls 40 and 42 function to limit deflection of the power jet 34 in order to prevent overdeflection thereof and resulting adverse effect on the output differential generated at output ports 24 and 26. The walls 40 and 42 and associated control passages 72 and 74 upstream therefrom as well as the receding wall portions 60 and 62 produce several further desirable effects. The control passages 72 and 74 vented to relatively low fluid pressure $P_3$ are effective in creating the well-known "Coanda effect" between the power jet 34 and the wall 40 or 42 closest thereto depending upon the direction of angular deflection of the power jet. Restrictions 76 and 78 in passages 72 and 74, respectively, function to restrict flow through passage 72 thereby controlling the degree of "Coanda effect" generated adjacent wall 40 when power jet 34 passes adjacent thereto and restrict flow through passage 74 to likewise control the "Coanda effect" generated adjacent wall 42 when power jet 34 passes adjacent thereto. The restrictions 76 and 78 may be selected to reduce the "Coanda effect" to the point where the power jet 34 will not operate in a bi-stable manner but will operate in a proportional manner with the degree of "Coanda effect" generated assisting deflection of the power jet 34 thereby reducing the control pressure differential $P_1$–$P_2$ required to deflect the power jet 34 a given amount thus aiding the gain of the fluidic amplifier.

Figure 3:
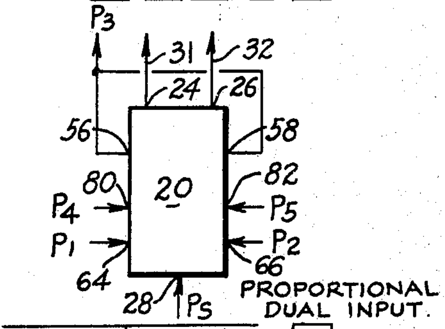
FIGURE 3 represents the fluidic amplifier of FIGURE 1 in block form with the various parts thereof connected to provide dual input, dual output proportional operation.

Referring to FIGURE 1 vented as indicated in FIGURE 3, the ports 80 and 82, like ports 64 and 66, are vented to separate sources of variable pressure fluid $P_4$ and $P_5$, respectively, controlled in a conventional manner by suitable control means, not shown. The control pressurized fluid injected transversely against power jet 34 by passages 72 and 74 leading from ports 80 and 82, respectively, adds to the effect of the control fluid at pressures $P_1$ and $P_2$ injected by control fluid passages 68 and 70 to deflect the power jet 34. Since the passages 72 and 74 are located downstream from orifice 38, the fluid at pressures $P_4$ and $P_5$ injected thereby has a lower gain effect than that of the fluid at pressures $P_1$ and $P_2$ injected by passages 68 and 70.

Figure 4:
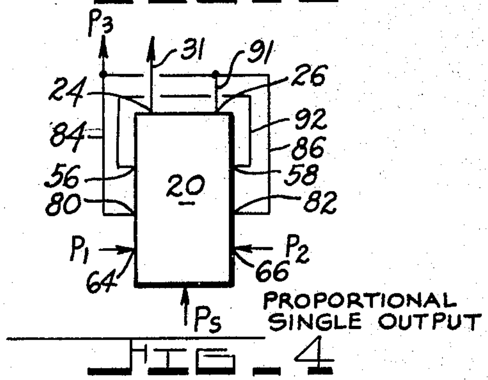
FIGURE 4 represents the fluidic amplifier of FIGURE 1 in block form with the various parts thereof connected to provide single output proportional operation.

Referring to FIGURE 1, vented as indicated in FIGURE 4, the ports 56 and 58 are connected via a passage 92 and therefore isolated from the vent source at pressure $P_3$. The control ports 80 and 82 are connected via passages 84 and 86 to vent pressure $P_3$ as in the case of FIGURE 2. The output port 26 is also connected by passages 91 and 86 to $P_3$, so that the remaining output port 24 provides a single output pressure for control purposes. In the venting arrangement of FIGURE 4, the aspirating characteristics of power jet 34 when discharging into the output passage 50 leading to port 26 are sufficient to reduce the fluid pressure in the passage 48 leading to control port 24 to less than vent pressure $P_3$. The ability to reduce output pressure to be equal to or less than the vent pressure $P_3$ is essential in many system applications of single output amplifiers.

Figure 5:
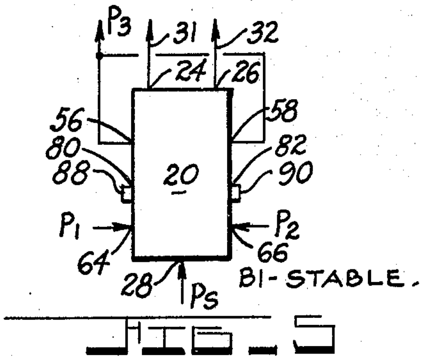
FIGURE 5 represents the fluidic amplifier of FIGURE 1 in block form with the various parts thereof connected to provide bi-stable operation.

Referring to FIGURE 1, vented as indicated in FIGURE 5, the control ports 80 and 82 are blocked by plugs 88 and 90, respectively, and the remaining ports vented in the manner of FIGURE 2. The venting arrangement of FIGURE 5 results in bi-stable operation with good latching characteristics by virtue of a relatively strong "Coanda effect" generated adjacent power jet 34. In this manner, a fluid pressure pulse $P_1$ applied through passage 68 in opposition to the lower fluid pressure $P_2$ results in deflection of power jet 34 toward wall 36 from which the power jet 34 deflects through orifice 38 to outlet passage 48 passing in close proximity to wall 40 whereupon the "Coanda effect" generated between wall 40 and power jet 34 in the region of passage 72 causes the power jet 34 to latch onto wall 40 and remain in that position when the control pressure differential $P_1$–$P_2$ dissipates. A pressure pulse $P_2$ applied through passage 70 in opposition to the lower fluid pressure $P_1$ results in the power jet 34 deflecting from wall 40 to wall 42 where the corresponding "Coanda effect" generated between wall 42 and power jet 34 in the region of passage 72 causes the power jet to latch onto wall 42. Obviously, with the ports 80 and 82 blocked by plugs 88 and 90 the restrictions 76 and 78 are not required in passages 72 and 74, respectively.

Figure 6:
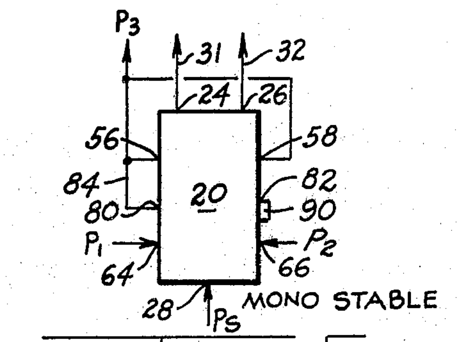
FIGURE 6 represents the fluidic amplifier of FIGURE 1 in block form with the various parts thereof connected to provide mono-stable operation.

Referring to FIGURE 1, vented as indicated in FIGURE 6, control port 82 is blocked by plug 90 and control port 80 is vented to pressure $P_3$ via passage 84. In this manner, the fluidic amplifier is made mono-stable with the power jet 34 latching to wall 42 when deflected adjacent thereto by virtue of the "Coanda effect" but not latching to wall 40 when deflected adjacent thereto.

Figure 7:
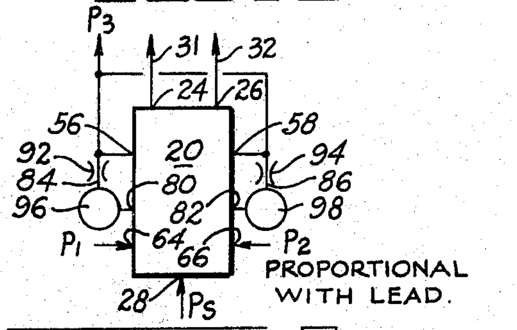
FIGURE 7 represents a modified arrangement of FIGURE 2 wherein surge volumes are suitably connected to provide proportional operation with a phase lead.

Referring to FIGURE 1, vented as indicated in FIGURE 7, passages 84 and 86 are provided with restrictions 92 and 94, respectively and fluid accumulator volumes defined by chambers 96 and 98 in series flow relationship with restrictions 92 and 94, respectively, and located between the latter restrictions and associated ports 80 and 82. The restrictions 76 and 78 in passages 72 and 74, respectively, may be eliminated so that without the action of restrictions 92 and 94 the gain of the fluidic amplifier is reduced, whereas with the action of restrictors 92 and 94 the gain is relatively high. With restrictions 76 and 78 eliminated and restrictions 92 and 94 ineffective, it will be recognized that the aforementioned "Coanda effect" generated adjacent walls 40 and 42 to assist in deections of power jet 34 will not occur thereby reducing amplifier gain accordingly. Initial response of the power jet 34 to the control fluid pressures $P_1$ and $P_2$ transmitted to passages 72 and 74, respectively, is at a relatively low gain by virtue of the accumulator effect of chambers 96 and 98. However, the amplifier gain increases with time as the effects of accumulator chambers 96 and 98 dissipate permitting restrictions 92 and 94 to become the effective control over fluid flow through passages 72 and 74, respectively. In this manner, the fluidic amplifier is made to operate in the well known "proportional plus integrating" manner which, in turn, provides phase lead action.

Figure 8:
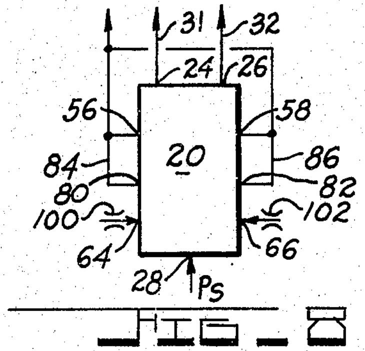
FIGURE 8 represents a modified arrangement of FIGURE 2 wherein the input control ports are provided with fluid restrictions.

Referring to FIGURE 1, vented as indicated in FIGURE 8, the fluid flow at pressures $P_1$ and $P_2$ into ports 64 and 66, respectively, may be controlled by restrictions 100 and 102 in flow controlling relationship with ports 64 and 66, respectively. The heretofore described fluidic amplifier is designed for little or no control flow through control passages 68 and 70 for nominal control input fluid pressures $P_1$ and $P_2$ with specified supply pressure $P_s$ and means control fluid pressures $P_1$ and $P_2$. It is sometimes desired to operate over a wide range of supply pressure $P_s$ and means control pressures $P_1$ and $P_2$ which deviate from the design pressures and therefor result in significant control fluid flow through control passages 68 and 70. In such a case, the control flow is substantially reduced by restrictions 100 and 102. Since control fluid flows at pressures $P_1$ and $P_2$, in any event, are relatively small under near null conduitions, the restrictions 100 and 102 to greatly increase control flow input impedance with very little pressure gain penalty. In addition, the restrictions 100 and 102 permit large control fluid pressure differential $P_1$–$P_2$ or mean control fluid pressures while retaining good saturation and gain characteristics.

We have found that, although the output passages 48 and 50 are located many power jet 34 widths downstream from orifice 33, good pressure recovery is achieved. It appears that in achieving very low control input flows vortices are generated along the sides of the power jet 34. Apparently, the vortices result in a more gradual velocity gradient at the sides of the power jet 34 which, in turn, reduces kinetic head losses. We have also found that substantial gains and pressure recoveries are retained with high (supersonic) supply to vent pressure ratios, $P_s/P_3$.

Figures 9, 10:
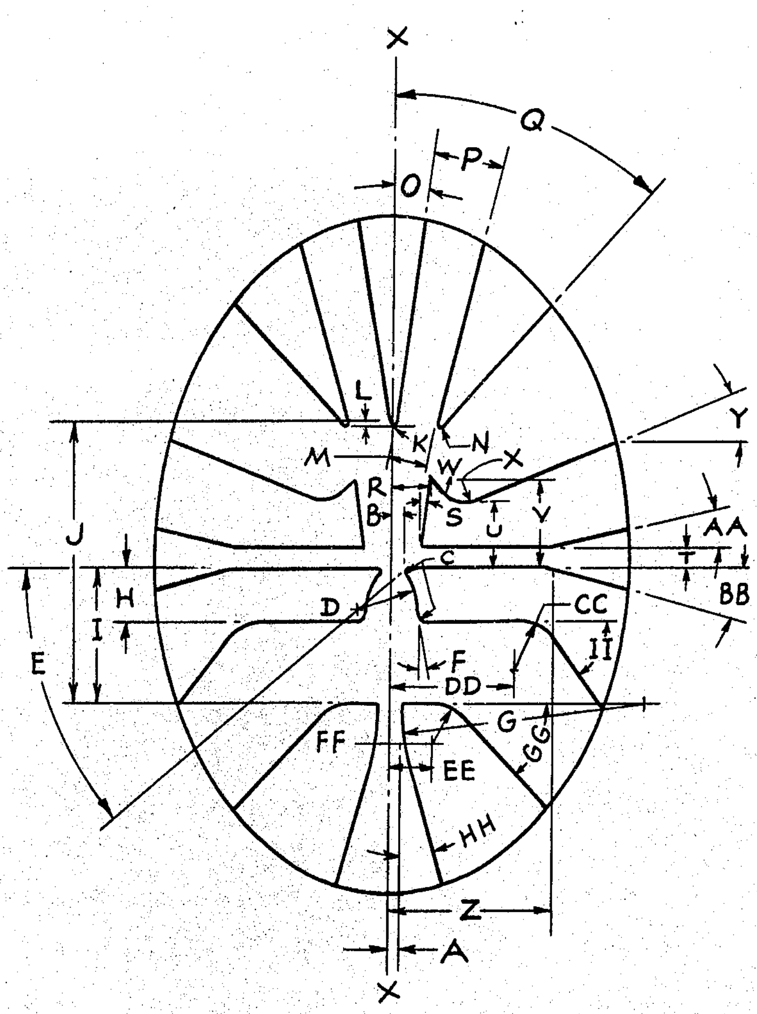
FIGURE 9 represents an enlarged view of a major portion of the fluidic amplifier of FIGURE 1 with critical dimensions thereof defined by letters.
FIGURE 10 represents a table listing the letter symbols of FIGURE 9 and dimensions corresponding thereto.

Referring to FIGURE 9, an enlarged view of a portion of fluidic amplifier 20 is shown to illustrate the dimensional relationship of sections of one practical example of the above described fluidic amplifier to thereby amplify the above description. FIGURE 10 is a table setting forth the dimensions corresponding to the letter symbols of FIGURE 9.

We claim:

1. A fluidic amplifier comprising:

a casing provided with a fluid inlet and two spaced apart fluid outlets;

a source of pressurized fluid connected to supply said inlet;

first orifice means connected to receive pressurized fluid from said inlet and inject a stream of said fluid axially therefrom toward said outlets;

fluid diverting means separating said two spaced apart outlets and adapted to divert a portion of said stream of fluid into each of said outlets to pressurize the same;

spaced apart fluid deflecting wall means downstream from said first orifice means and converging in the direction of flow therethrough of said stream of fluid to form second orifice means axially aligned with said first orifice means;

opposing first and second control fluid passage means in said spaced apart wall means and connected to first and second sources of controlled pressurized fluid, respectively, and adapted to generate a control fluid pressure differential across said stream of fluid to angularly deflect said stream of fluid relative to the axis of said first orifice means and cause said stream of fluid to impinge one of said fluid deflecting wall means depending upon the relative angular deflection thereof;

said first and second control fluid passages each defining a pressurized fluid opening adjacent said stream of fluid and extending in the direction of flow thereof a distance equal to as least half the spacing between said first and second orifice means;

said spaced apart wall means together with said pressurized fluid openings defined by said first and second control fluid passages being operative to generate a fluid swirl adjacent said stream of fluid to thereby minimize entrainment and thus flow of fluid from said pressurized fluid openings by said stream of fluid;

said one fluid deflecting wall means being effective to deflect said impinging fluid stream angularly through said second orifice means and relative to said fluid diverting means to thereby vary the relative portions of said fluid stream diverted to said fluid outlets and produce a corresponding output pressure differential therebetween.

2. A fluidic amplifier as claimed in claim 1 wherein:

said spaced apart fluid deflecting wall means are concave and converge at a selected angle to form said second orifice means having an effective width substantially equal to the width of said stream of fluid passing therethrough.

3. A fluidic amplifier as claimed in claim 1 wherein: said output pressure differential is caused to vary in proportion to said control fluid pressure differential.

4. A fluidic amplifier as claimed in claim 1 and further including:

second spaced apart wall means downstream from said second orifice means and between which said stream of fluid passes to said outlets;

said second spaced apart wall means diverging in the direction of flow of said fluid stream therebetween and being aligned with said fluid outlets to thereby prevent over deflection of said stream of fluid relative to said outlets.

5. A fluidic amplifier as claimed in claim 4 and further including:

opposing third and fourth fluid passages opening transversely into communication with said stream of fluid intermediate said second orifice means and said second spaced apart wall means;

said third and fourth fluid passages being connected to third and fourth sources of controlled pressurized fluid, respectively, and adapted to inject fluid transversely against said stream of fluid thereby generating a control fluid pressure differential thereacross to add to the deflection of said stream of fluid.

6. A fluidic amplifier as claimed in claim 4 and further including:

opposing third and fourth fluid passages opening transversely into communication with said stream of fluid intermediate said second orifice means and said spaced apart wall means;

a source of relatively low pressure fluid connected to said third and fourth passages;

said third and fourth passages being adapted to generate a low pressure region adjacent said stream of fluid and one of said second spaced apart wall means depending upon the direction on angular deflection of said stream of fluid to thereby minimize the control fluid pressure differential required to deflect said stream of fluid a given amount.

7. A fluidic amplifier as claimed in claim 6 and further including:

fluidic accumulator chamber means and fluid flow restriction means connected in series flow relationship with each of said third and fourth fluid passages for controlling fluid flow between said third and fourth passages and said relatively low pressure fluid source to thereby vary the response of said stream of fluid to said control fluid pressure differential as a function of time to provide phase lead.

8. A fluidic amplifier as claimed in claim 4 wherein said amplifier is bi-stable in operation and further includes:

opposing third and fourth dead-ended passages opening transversely into communication with said stream of fluid intermediate said second orifice means and said second spaced apart wall;

said third and fourth dead-ended passages being adapted to generate a low pressure region adjacent said stream of fluid and one of said second spaced apart wall means depending upon the direction of angular deflection of said stream of fluid;

said low pressure region causing said stream of fluid to become attached to said one of said second spaced apart wall means and remain in said attached position upon dissipation of said control fluid pressure differential.

9. A fluidic amplifier as claimed in claim 4 wherein said amplifier is mono-stable in operation and further includes:

a dead-ended passage opening transversely into communication with said stream of fluid intermediate said second orifice means and one of said second spaced apart wall means;

said dead-ended passage being adapted to generate a low pressure region adjacent said stream of fluid and said one of said second spaced apart wall means to thereby cause said stream of fluid to become attached to said one of said second spaced apart wall means and remain in said attached position upon dissipation of said control fluid pressure differential.

10. A fluidic amplifier as claimed in claim 4 and further including:

third and fourth fluid passages opening transversely into communication with said stream of fluid intermediate said second spaced apart wall means and said spaced apart fluid outlets;

a relatively low pressure fluid source connected to said third and fourth fluid passages;

said third and fourth fluid passages being adapted to generate a low pressure region adjacent the deflected stream of fluid.

11. A fluidic amplifier as claimed in claim 4 and further including:

opposing third and fourth fluid passages opening transversely into communication with said stream of fluid intermediate said second spaced apart wall means and said spaced apart fluid outlets; and passage means connecting said third and fourth passages.

12. A fluidic amplifier as claimed in claim 1 and further including:

a relatively low pressure reference fluid source connected to one of said two fluid outlets; and output load means connected to the other of said two fluid outlets and causing the output pressure to be responsive to the flow therefrom.

References Cited

UNITED STATES PATENTS

| | | | |
|---|---|---|---|
| 3,420,253 | 1/1969 | Griffin | 137—81.5 |
| 3,171,422 | 3/1965 | Evans | 137—81.5 |
| 3,187,763 | 6/1965 | Adams | 137—81.5 |
| 3,219,271 | 11/1965 | Bauer. | |
| 3,223,101 | 12/1965 | Bowles | 137—81.5 |
| 3,233,622 | 2/1966 | Boothe | 137—81.5 |
| 3,148,691 | 9/1964 | Greenblott | 137—81.5 |
| 3,326,463 | 6/1967 | Reader | 137—81.5 XR |
| 3,357,441 | 12/1967 | Adams | 137—81.5 |
| 3,380,655 | 4/1968 | Swartz | 137—81.5 XR |
| 3,398,758 | 8/1968 | Unfried | 137—81.5 |
| 3,016,063 | 1/1962 | Hausmann | 137—81.5 |

SAMUEL SCOTT, Primary Examiner